Aug. 29, 1967   F. T. GOSTOMSKI   3,338,554
SCREW ACTUATED JACK MEANS
Filed May 3, 1965   3 Sheets-Sheet 1
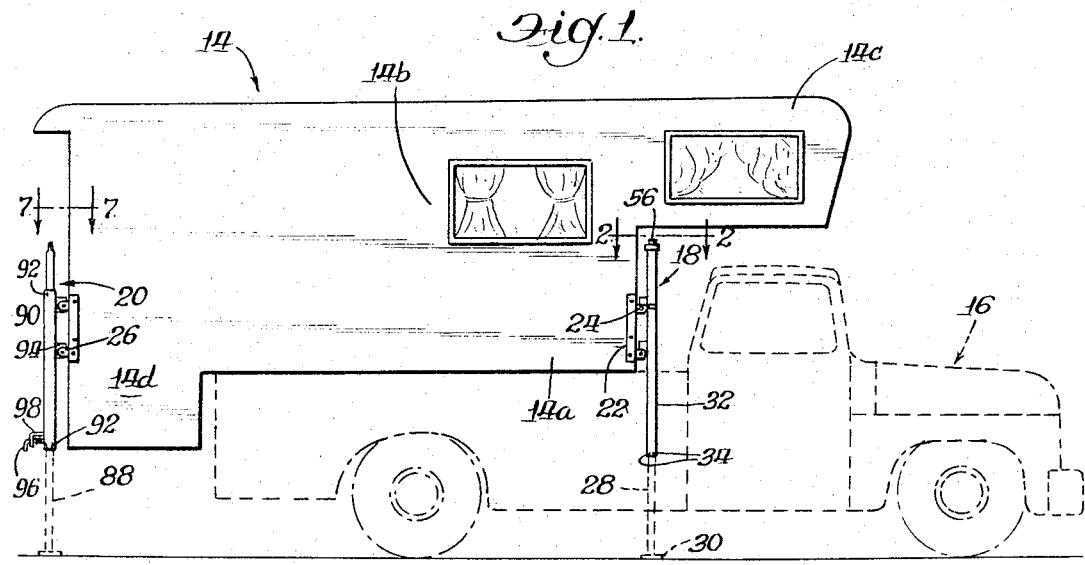
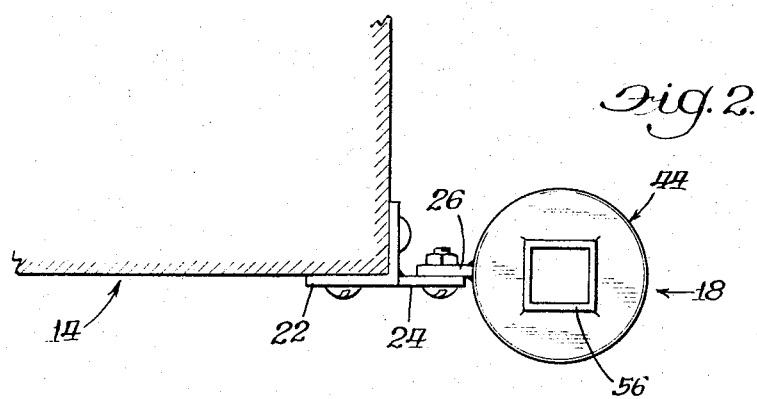
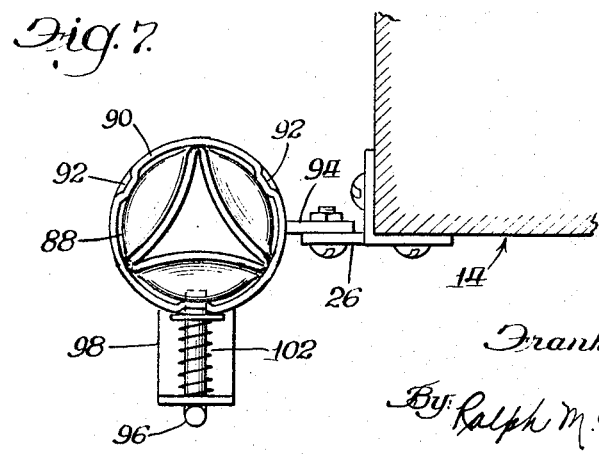
Inventor:
Frank T. Gostomski
By Ralph M. Faust
Atty.

Aug. 29, 1967  F. T. GOSTOMSKI  3,338,554
SCREW ACTUATED JACK MEANS
Filed May 3, 1965  3 Sheets-Sheet 2
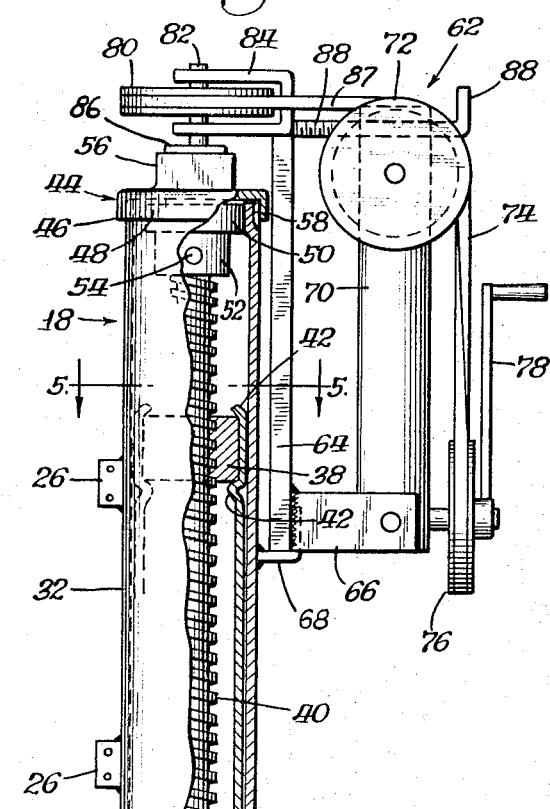
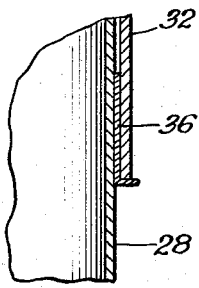
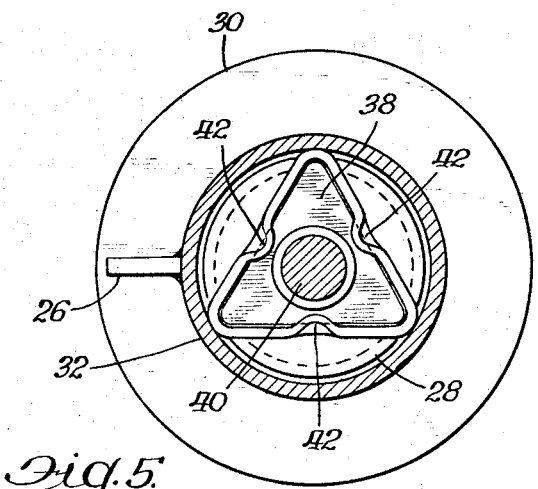
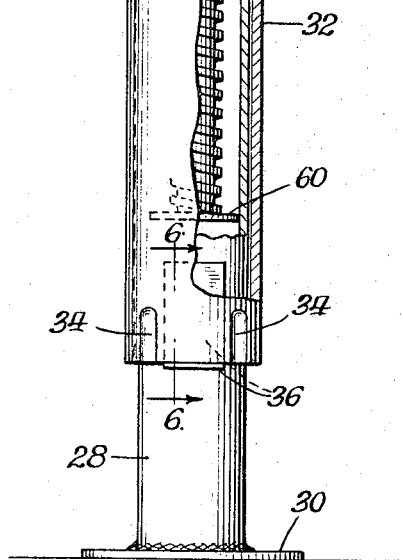
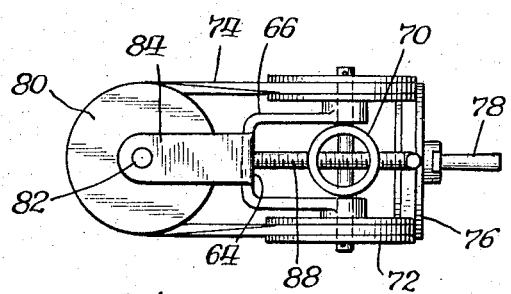
Inventor:
Frank T. Gostomski
By: Ralph M. Faust
Atty.

Aug. 29, 1967  F. T. GOSTOMSKI  3,338,554
SCREW ACTUATED JACK MEANS

Filed May 5, 1965  3 Sheets-Sheet 3

Inventor:
Frank T. Gostomski
By: Ralph M. Faust
Atty.

United States Patent Office 3,338,554
Patented Aug. 29, 1967

3,338,554
SCREW ACTUATED JACK MEANS
Frank T. Gostomski, 3019 E. 54th Ave.,
Tacoma, Wash. 98424
Filed May 3, 1965, Ser. No. 452,753
10 Claims. (Cl. 254—103)

ABSTRACT OF THE DISCLOSURE

The jack means includes inner and outer telescoping tubes interconnected by screw means. The outer tubes of a plurality of such jack means are secured, for example, to a camper mounted on a truck body. Actuating means is operatively connected to the screw means so that the inner tubes may be lowered to the ground after which continued operation of the actuating means lifts the camper off of the truck body.

---

The present invention relates to a jack and more specifically a jack of a kind of which several are used for bodily raising and lowering, as well as leveling large objects. Such jacks are especially adapted to use with "campers" and are sometimes known as camper jacks. A "camper" is a mobile home mounted on a truck for transporting it and then when in location, removed from the truck and supported by the ground. These jacks are utilized for raising the camper for loading it on a truck and lowering it from the truck onto the ground. The jacks are also utilized for leveling the camper where uneven ground is encountered. It will be understood that the jack is not limited to use with campers but may be used with any of various objects, but for the sake of convenience and simplicity, the following disclosure is based on its use with a camper.

A main object of the present invention is to provide a jack of the foregoing general character which is of such novel construction as to facilitate mounting it directly on the object to be raised and lowered, or camper.

Another object of the invention is to provide a jack of the foregoing character which involves novel construction for mounting it rigidly on the camper whereby to provide greater stability of the camper when it is supported by a plurality of such jacks, thus eliminating cumbersome structures heretofore used for stabilizing the jacks.

Another object is to provide a jack of the foregoing character together with a novel leg of structure similar to that of the jack and specially adapted to use therewith.

Still another object is to provide a jack of the foregoing character having a simple structural main column and a demountable power unit, such as a crank or winch, normally carried in the camper in traveling, but easily applicable to the column for the raising or lowering functions, the mounting of the columns directly on the exterior of the camper leaving space in the interior for other items, such space being at a premium; this feature of the invention also results in substantial time saving in that the major portion of the jack remains mounted on the exterior of the camper.

Another object is to provide a jack having enclosed operating means, for example screw means, such operating means therefore being protected from the weather.

Another object is to provide a jack of the foregoing character of simple structure although extremely rigid and effective in operation for the results intended.

Other objects and advantages of the invention will appear from the following detailed description taken in conjunction with the accompanying drawings wherein:

FIGURE 1 is a side elevational view of a camper having jacks of the present invention applied thereto and mounted on a truck;

FIGURE 2 is a large scale view taken at line 2—2 of FIGURE 1;

FIGURE 3 is a view partially in elevation and partially in section of one form of jack of the invention;

FIGURE 4 is a top view of FIGURE 3;

FIGURE 5 is a view taken at line 5—5 of FIGURE 3;

FIGURE 6 is a sectional view taken at lines 6—6 of FIGURE 3;

FIGURE 7 is a large scale view taken at line 7—7 of FIGURE 1;

Figure 8:
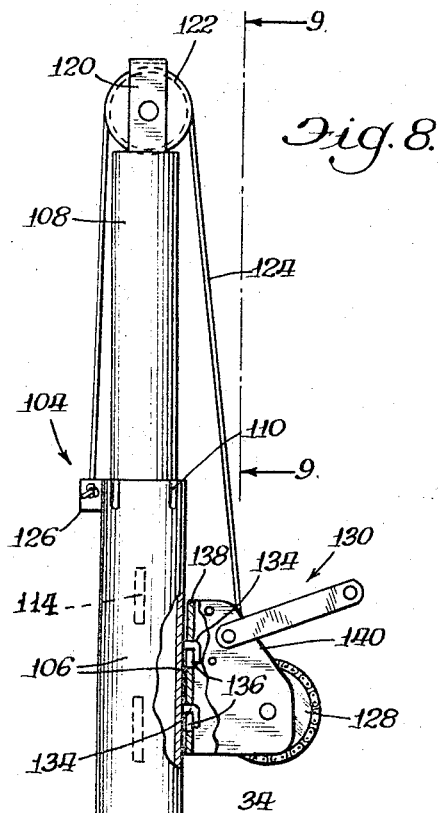
FIGURE 8 is a side view, mainly in elevation but partially in section, of a second embodiment of the invention.

Referring now in detail to the drawings attention is directed first to FIGURE 1 showing a camper 14 of known kind and common shape, shown mounted on a truck 16 utilized for transporting it, the truck being shown in phantom view. The camper has a relatively narrow bottom section 14a extending into the truck box and resting on the bed thereof, and a main, wider section 14b which extends laterally over the sides of the trunk box. A "cabover" section 14c may be included as well as a depending rear section 14d rearwardly of the truck end extending closer to the ground. A jack 18 is secured to the camper 14 at each of two corners of the camper, such as the front corners and an adjustable leg 20 at each of the other two or rear, corners the jacks and legs embodying the features of the present invention. When the camper is mounted on the truck in transporting position, the jack and leg are of course in inactive position, with their ground engaging lower ends lifted from the ground. When it is desired to remove the camper from truck, these ground engaging lower ends are lowered into engagement with the ground and the jacks then effectively raised for raising the camper, and the truck is then removed from under the camper. The jacks and legs may be permanently mounted on and carried by the camper.

Both the jack 18 and leg 20 are rigidly mounted on the camper at vertically spaced points, thereby to eliminate tilting of the jack and leg relative to the camper and consequently provide stable support thereof. In each case an angle bracket 22 is secured to the corner of the camper (see FIGURES 2 and 7), each having a pair of vertically spaced, laterally extending lugs or ears 24. The jack 18 and leg 20 each has a pair of cooperating lugs or ears 26 (see below) secured to the first lugs as by bolts.

Attention is next directed to FIGURE 3 showing one form of jack made according to the present invention. This jack includes an inner support tube 28 adapted for engaging the ground and having a foot element 30 therefor. Slidably telescoped over the support tube 28 is an outer guide and mounting tube 32. These tubes, as well as the tubes in the post 20 to be described later, may be made of any of a number of materials, such as steel, aluminum and fiberglass, as well as other materials. The outer tube 32 may be provided with a plurality of indentations 34 for establishing guiding engagement with the inner tube. However, similar bearing surfaces may also be formed by plastic nylon rivets, for example, the shanks of the rivets being fitted in holes in the inner tube and the heads thereof engaging the outer tube. Preferably a clip 36 is driven into the space between the inner and outer tubes for frictionally holding the inner tube against accidental drifting lowering movements in travel, as referred to again hereinbelow. The outer tube 32 has engagement also at its upper ends with the inner tube 28 as shown in FIGURE 5. The upper end of the inner tube is preferably of triangular shape for holding a triangular nut 38 which has threaded engagement with a power screw 40 referred to again hereinbelow. This nut may be made of cast iron, or nylon, for example. The upper end of the inner tube is also crimped or indented as at 42, along the flate sides of the triangular shape, both above and below the nut for holding the nut in place. The apexes of the triangular shape of the inner tube form the points of engagement between that tube and the outer tube.

The lugs 26 on the jack, referred to above are seen in FIGURE 3. These lugs are secured to the outer tube 32 in any suitable manner such as by welding.

The upper end of the outer tube 32 is provided with a closure and driving unit indicated in its entirety at 44 and including a cap 46 which encloses the upper end of the tube and provides for shedding water from the interior. This cap 46 has a depending flange 48 surrounding the upper end of the tube. A thrust bearing 50 is secured to the cap and has a downwardly opening socket 52 receiving the upper end of the screw 40. The screw is mounted therein by suitable means such as a rivet 54 for rotation of the screw in response to rotation of the cap. The cap is provided with an upwardly extending socket 56 polygonal in shape, preferably square, for receiving a driving element on the power raising means described hereinbelow. Preferably the upper end of the outer tube 32 is provided with a plurality of crimps or indentations 58 engaging the thrust bear 50 and centering the closure member in the outer tube 32. The lower end of the screw 40 may be provided with a washer 60 welded thereon, for providing guiding engagement with the inner tube 28.

The power raising means mentioned includes a demountable cranking unit indicated in its entirety at 62. This cranking unit may be readily mounted on the jack proper for raising and lowering functions, and easily lifted off for storing it in the interior of the camper. The cranking unit includes a vertical frame member 64, constituting the main supporting member thereof and having a pair of horizontally extending ears 66, forming with the member 64 a U-shaped member. The lower end of the member 64 is received in a hook 68 secured as by welding to the outer tube 32, the extended end of the hook being positioned between the lugs or ears 66.

Pivotally mounted in and between the outer ends of the ears 64 is a vertically extending post 70, which may be tubular, and mounted at the upper end of this post is a pair of pulleys 72 on opposite ends of a shaft mounted in the upper end of the post. An endless belt 74 is trained over these pulleys and on a lower pully 76 mounted in the lower end of the post 70 on an axis generally horizontal and transverse to the axis of the pulleys 72. A crank 78 is secured to the lower pulley 76 as by welding. The opposite end of the endless belt is trained over another pulley 80 supported on a vertical axis. This pulley 80 is mounted on a shaft 82 carried in a U-shape bracket 84 secured to the upper end of the member 64.

Secured to the lower end of the shaft 82 is a drive element 86 which fits in the drive socket 56, being correspondingly polygonal. A belt tightening screw 87 is threadedly mounted in the upper end of the post 70, engaging the bracket 84 and operative upon turning in one direction for swinging the post 70 outwardly away from the member 64 and tightening the belt 74.

Upon rotation of the crank 78 and consequent running of the belt, the drive element 86 is rotated which acting through the socket 56 rotates the screw 40. This rotation of the screw acting through the nut 38 causes relative vertical movement between the inner tube 28 and the outer tube 32. When the jack is mounted on the camper, and the inner tube is worked downwardly, it lowers until it engages the ground and then upon continued operation of the screw, the outer tube, ad the camper, are elevated relative to the inner tube.

The cranking unit 62 is applicable to and removable from the jack proper in the simplest of maneuvers, the lower end of the unit 64 being inserted in the hook 68 and the driving element 86 inserted in the socket 56. It is removed therefrom in opposite movements.

The screw threaded drive provided by the screw 40 results in an immense mechanical advantage so that great loads can be handled by relatively small power applied, and it also provides a substantial safety factor in that the load supported thereby will not, by mere gravity action, cause rotation of the screw and consequent accidental lowering of the load.

The clip 36 is driven into the space between the inner and outer tubes and provides frictional engagement between those tubes to prevent their relative movement when the jack is in inactive position as in traveling, such as might otherwise occur without the clip, by vibration between the parts.

The leg 20 includes an inner tube 88 arranged for engaging the ground, and an outer tube 90 slidably telescoped thereover. The outer tube may be provided with crimps 92 for establishing controlled engagement with the inner tube. Secured to the outer tube are vertically spaced lugs 94, similar to the lugs 26 on the jack for securement to corresponding lugs 24 on the angle brackets 22.

A pin 96 is slidably mounted in a clip 98 on the outer tube and extends through an aperture in the outer tube and into selected ones of apertures 100 in the inner tube. A compression spring 102 surrounds the shank of the pin between the clip and the outer tube, biasing the pin inwardly into locking position.

Upon raising the camper on one side or the other, by the jack 18, the pin 96 in the leg 20 is released from the inner tube and the inner tube extended into engagement with the ground, or nearly so; the pin is then released in register with one of the apertures 100 in the inner tube and it enters into such aperture to hold the inner tube in such adjusted position. In traveling, the inner tube is of course carried in position raised from the ground.

Figure 10:
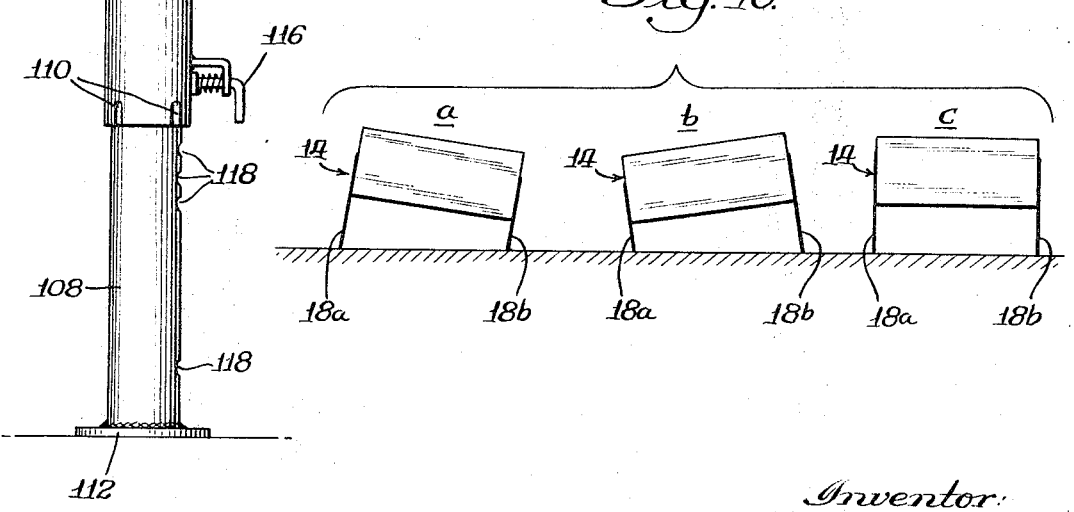
FIGURE 10 is a semi-diagrammatic view of a camper having jacks of the present invention mounted thereon and showing in different views of the figure different steps in the raising and lowering movements of the camper.

In using the jack and leg of the present invention, preferably a jack 18 is secured to each of the front corners of the camper while a leg 20 is secured to each of the rear corners, as indicated above. Two such jacks are sufficient, the legs serving to hold the corresponding corners of the camper in raised or lowered position in response to movement of the camper to that position by the jacks. Specifically in raising the camper, steps are taken as indicated in FIGURE 10, for example the views of this figure show the camper from the front end, or as viewed from the right of FIGURE 1. These views assume the camper, at the beginning of these steps, to be supported on the ground, either by the jacks and legs, or by the camper directly engaging the ground. To raise the camper, one of the jacks, e.g. 18a is extended and because of the rigid connection between the jack and the camper, the camper is tilted bodily in the corresponding direction, or clockwise as viewed in FIGURE 10a, with of course the rear corner being elevated correspondingly, since the camper is of rigid construction throughout, as will be understood. The operator extends this jack a suitable distance, such for example as about 6″ or 7″, and then extends the leg 20 at the corresponding rear corner as above described until it touches, or nearly touches the ground. He then extends the jack 18b at the opposite front corner until it is inclined upwardly beyond the height determined by the first jack or as indicated in FIGURE 10b, the extension of the second jack being for example in the neighborhood of 13″. He then goes to the corresponding rear corner of the camper and extends the leg 20 at that corner. This procedure is continued until the camper is raised the desired distance, for enabling the truck to be driven thereunder. It will be understood that the last extension of the jack should be sufficient to substantially level the camper. After the truck is placed under the camper, the camper is lowered into position by reverse movements of the jacks and legs. To remove the camper from the truck, it will be understood of course that the foregoing steps are taken in reverse from the order described. The leg 20, in the broad concept of the invention, constitutes jack means in that it is operative for supporting the camper at different heights.

Figure 9:
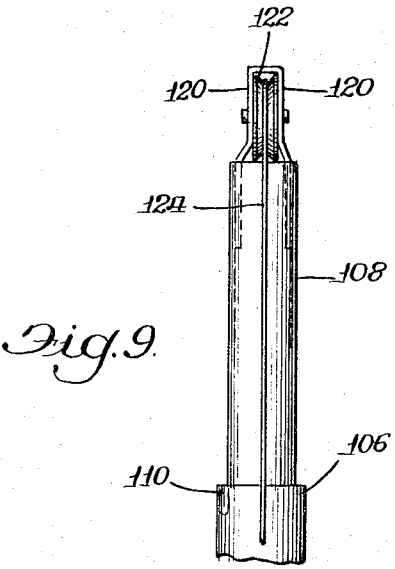
FIGURE 9 is side view of the upper end of FIGURE 8.

Attention is now directed to FIGURES 8 and 9 showing a modified form of jack, here identified as 104. This jack includes an outer tube 106 telescoped over an inner tube 108, and having crimps 110 for establishing controlled engagement with the inner tube. The inner tube is adapted to engage the ground and has a foot 112 for that purpose.

The outer tube has lugs 114 secured thereto for connection with the lugs 24 on the camper. Also a lock pin 116, similar to the pin 96 in the post, is provided on the outer tube and arranged for releasable engagement with selected apertures 118 in the inner tube for safety-locking the jack in adjusted position.

The inner tube 108 is substantially longer than the outer tube and at its upper end is provided with an upwardly extending bracket 120 for rotatably supporting a sheave 122 therebetween. The bracket 120 has side elements 121 positioned with minimum space between, themselves and the sides of sheave 122 to prevent the cable from accidentally running off the sheave. A flexible cable 124 is trained over the sheave and has one end releasably secured in lugs 126 and the other end operably connected with an operating member 128 of a winch indicated in its entirety at 130. A crank 132 is provided, which upon rotation thereof rotates the operating member 128 and draws up, or permits paying out, the cable in a known manner. The winch 130 itself is of known kind and is provided with usual holding pawls etc. Upon pulling up of the cable the outer tube is pulled upwardly and because of the connection of the outer tube with the camper, the camper is of course raised. Upon releasing the cable, the outer tube, and thus the camper is permitted to lower.

The winch 130 is readily mountable on and demountable from the outer tube as shown in FIGURE 8. The outer tube is provided with a pair of vertically spaced hooks 134 which are received in correspondingly spaced apertures 136 in the web element 138 of chassis 140 of suitable structure supporting the operating members of the winch. The winch is thus easily mounted on the jack by moving it toward the jack with the apertures aligned with the hooks and then lowering the winch. It is removed as readily, in reverse movements. The opposite end of the cable is provided with a quick detachable connection with lugs 126 so that the winch and cable can be applied to and removed from the jack quickly and with little effort. The winch and the cable can then be stored in the camper while the jack proper remains mounted on the exterior of the camper. Thus a great saving in space is provided in that the jacks themselves need not be stored in the camper while the camper is in travel or in demounted position for living.

The great range of relative movement between the parts of the jack facilitates placing the camper directly on the ground, if that is desired, and raising it to a great height for placing it on the truck, and of course any position in between, if it is desired to support the camper by the jacks and legs, as in the case of uneven ground. This great range of relative movement also works to good advantage in travel, when the ground engaging parts of the jack can be raised to their maximum position so as not to extend below the lower limits of the camper.

Quite an advantage is realized in that a single power unit will serve for all the jacks, minimizing cost as well as space within the camper for storing it.

A selection of speed ratios of the power unit may be attained, by selecting a lower pulley 76 of larger or smaller size. Also the frame member 64 of any selected length may be utilized, to locate the crank the desired height regardless of the overall height of the jack.

The completely exterior mounting of the jacks and legs provides another advantage in that there is no necessity for removing panels in the interior, for example, as in the case of jacks mounted at least partially in the interior.

The safety-lock pin 116 provides for positive locking of the jack in extended position to provide against such accidents as failure of the winch or breakage of the cable.

While the preferred arrangement includes the use of two jacks and two legs, the invention is not limited thereto. For example three jacks may be used, two at the front and rear corners on one side and one in the middle of the other side. In the latter case, no legs would be used.

While I have disclosed herein certain preferred embodiments of the invention it will be understood that changes may be made therein within the scope of the appended claims.

I claim:

1. A jack of the character disclosed comprising in combination an outer tube, an inner tube slidably telescoped in the outer tube, means for securing the outer tube at a plurality of spaced points on an object to be raised and lowered, an elongated screw in the jack having its upper end adjacent the upper end of the outer tube and extending downwardly therein and into the inner tube, a nut threadedly receiving the screw, the nut having a polygonal exterior and being rigidly mounted in the upper end of the inner tube, a drive member secured to the upper end of the screw and journalled on the upper end of the outer tube, said drive member having an upwardly opening polygonal socket, and a manually operable power unit detachably mounted on the jack and having one point of connection with the exterior of the outer tube and having a driving element detachably mounted in said socket in the drive member on the screw means, said power unit having a manually operable crank means, and a drive transmitting element between the crank means and the driving element, said driving element also constituting one of the means for retaining the power unit on the remainder of the jack.

2. The invention set out in claim 1 wherein the power unit includes a main frame member disposed in vertical position when the unit is mounted on the jack and having its lower end detachably mounted on the outer tube, a post pivotally mounted at its lower end on and adjacent the lower end of the frame means, a pulley journalled in the lower end of the post on a horizontal axis, second pulley means journalled in the upper end of the post on a horizontal axis transverse to the axis of the first pulley, and a third pulley mounted on a vertical axis on the upper end of the frame member, a shaft supporting said third pulley and having said drive element on the lower end thereof, and an endless belt trained on said pulleys and operable for driving said driving element upon rotation of said first pulley means.

3. The invention set out in claim 2 wherein a belt tightening screw is incorporated in the unit and is operable for reacting between the upper end of the post and the upper end of the main frame member and operative upon turning in one direction for swinging the upper end of the post outwardly from the frame member and thereby tightening the belt means.

4. The invention set out in claim 1 wherein one of the tubes has indentations formed therein for establishing controlled sliding engagement with the other tube, and clip means is provided and interposed in the space between the tubes and operative for frictionally retaining the tubes against drifting relative movement.

5. A power unit adapted for use in conjunction with a vertical jack and including a main frame member disposed vertically when mounted on the jack, a post pivotally mounted at its lower end in the lower end of the frame member, a pulley journalled on a horizontal axis at a lower end of the post, a crank secured to the pulley, second pulley means including a pair of pulleys journalled on a horizontal axis in the upper end of the post, a third pulley mounted on the upper end of the frame member, and shaft means mounted in the frame supporting said third pulley, said shaft having a drive element in its lower end adapted for operable connection with an element to be driven in the jack, and an endless belt trained over said pulley and operable for driving said driving element upon rotation of the first pulley.

6. The invention set out in claim 5 wherein the inner tube projects downwardly beyond the outer tube for engaging the ground, and also projects upwardly beyond the tube, a sheave is mounted on the upper end of the inner tube, side ears are mounted on the inner tube and support the sheave and provide confining means for the sheave, and the cable is trained on the sheave and has its end remote from the winch detachably connected with the upper end of the outer tube.

7. The invention set out in claim 5 including manually actuatable safety pin mounted on the outer tube and releasably extending through aligned apertures in the outer and inner tubes.

8. Jack and leg means for use in conjunction with a rigid object to be raised and lowered, including a pair of jacks and a pair of legs mounted at respectively different corners of the object, each of the jacks and the legs including an outer tube and an inner tube slidably telescoped in the outer tube, means mounting each outer tube at a plurality of vertically spaced points on the object and thereby providing a rigid connection between the jacks and legs and the object, the inner tube in each of the jacks and legs being extensible downwardly for engagement with the ground, a manually operable power unit detachably mounted on the outer tube in each of the jacks, and having an operable connection between the outer and inner tubes for manually extending the jacks and controlling the contraction thereof, and manually actuatable means for releasably locking the inner tubes in the legs in extended positions of the inner tubes relative to the outer tubes.

9. A method of raising a rigid object, comprising providing a pair of jacks and a pair of legs each including an outer tube and an inner tube slidably telescoped in the outer tube, securing the jacks and legs at respectively different corners on the rigid object, extending a first of the jacks so that it operatively engages the ground and raises the corresponding corner of the rigid object, and because of the rigidity of the object raising another corner having a first leg connected therewith, then extending said first leg until it substantially engages the ground and locking it in such extended position, and then extending the other jack and thereby raising the corresponding corner of the object and again because of the rigidity of the object raising the fourth corner to which a second leg is secured, and then extending the second leg until it substantially engages the ground, and repeating the foregoing steps until the object is raised the desired amount.

10. A jack of the character disclosed for use with a rigid object to be raised and lowered, comprising in combination, an outer tube, an inner tube telescoped in the outer tube, means securing the outer tube to the object at a plurality of vertically spaced points thereby rigidly mounting the jack on the object, screw means operatively interconnecting the tubes whereby the inner tube is capable of being raised relative to the outer tube when the outer tube is secured to the object, whereby the jack is supported solely by the object, and being capable of being lowered relative to the outer tube and into engagement with the ground, power means on the outer tube operatively connected to the screw means for relatively lowering the inner tube and raising the outer tube, whereby upon engagement by the inner tube with the ground and continuing such relative movement, the upper tube is raised and it raises the object to which the jack is secured, an operating element connected to the screw means and exposed to the exterior at the top, a hook on the outer tube for detachably supporting one end of the power means, the power means including a driving element operatively connected to said operating element.

References Cited

UNITED STATES PATENTS

| | | | |
|---|---|---|---|
| 2,517,304 | 8/1950 | Greening | 214—515 |
| 2,985,482 | 4/1961 | Lion | 214—515 |
| 2,995,397 | 8/1961 | Eames | 214—515 X |
| 3,074,576 | 1/1963 | Peterson | 214—515 |
| 3,139,266 | 6/1964 | Tew | 254—47 |
| 3,158,354 | 11/1964 | Ward | 254—47 |
| 3,186,570 | 6/1965 | Bunnell | 214—515 |

OTHELL M. SIMPSON, *Primary Examiner.*